US009082300B2

(12) United States Patent
Scott

(10) Patent No.: US 9,082,300 B2
(45) Date of Patent: Jul. 14, 2015

(54) DEFINED INTERVAL (DI) RISK BASED AIR TRAFFIC CONTROL SEPARATION

(71) Applicant: William F Scott, Carlsbad, CA (US)

(72) Inventor: William F Scott, Carlsbad, CA (US)

( * ) Notice: Subject to any disclaimer, the term of this patent is extended or adjusted under 35 U.S.C. 154(b) by 131 days.

(21) Appl. No.: 13/897,260

(22) Filed: May 17, 2013

(65) Prior Publication Data

US 2013/0317731 A1 Nov. 28, 2013

Related U.S. Application Data

(60) Provisional application No. 61/650,332, filed on May 22, 2012.

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 5/00*** | (2006.01) |

(52) U.S. Cl.

CPC ............ *G08G 5/0017* (2013.01); *G08G 5/0013* (2013.01); *G08G 5/0043* (2013.01)

(58) Field of Classification Search

CPC . G08G 5/0013; G08G 5/0043; G08G 5/0021; G08G 5/065; G08G 5/0039; G06Q 50/30; G01C 21/00

USPC ........................................ 701/120, 121, 122

See application file for complete search history.

(56) References Cited

U.S. PATENT DOCUMENTS

| | | | | |
|---|---|---|---|---|
| 4,827,418 | A | 5/1989 | Gerstenfeld | |
| 6,542,809 | B2 | 4/2003 | Hehls, III | |
| 7,277,043 | B2 | 10/2007 | Arthur et al. | |
| 7,860,642 | B2 | 12/2010 | Sandell et al. | |
| 8,255,147 | B2 | 8/2012 | Roberts et al. | |
| 8,645,009 | B2 | 2/2014 | Klooster | |
| 2002/0120391 | A1 * | 8/2002 | Nehls, III | 701/120 |
| 2004/0059504 | A1 * | 3/2004 | Gray | 701/301 |
| 2006/0109166 | A1 * | 5/2006 | Arthur et al. | 342/29 |
| 2013/0221164 | A1 * | 8/2013 | Klooster | 244/180 |

* cited by examiner

*Primary Examiner* — Behrang Badii
*Assistant Examiner* — Daniel L Greene

(57) ABSTRACT

A method and process of an optimized, derivational risk-based air traffic control system state capitalizing on data exchange and interactive surveillance modalities with satellite functionality. Data interrogation will exchange operationally relevant real-time information amongst users and regulators, and a computer complex wherein data exchanges accumulate for application of risk model criterion and sovereign requirements. The risk model compares optimization of the system state with current state and communicated intent, making value judgments concerning safety and efficiency of the system as a whole and at intervals over time. Intuitive localization "swabs" reflecting collision potential, upset potential and other risks associated with any operation of air traffic control objects, manifest this. Localization solution set information is transmitted where necessary for implementation and may be proximity assurance tasks or operational requirements that must be performed within defined boundaries creating non-risk adverse associations.

6 Claims, 4 Drawing Sheets

DI SWAB 1 (Plan View – example)

FIGURE 1 DI SWAB 1 (Plan View – example)
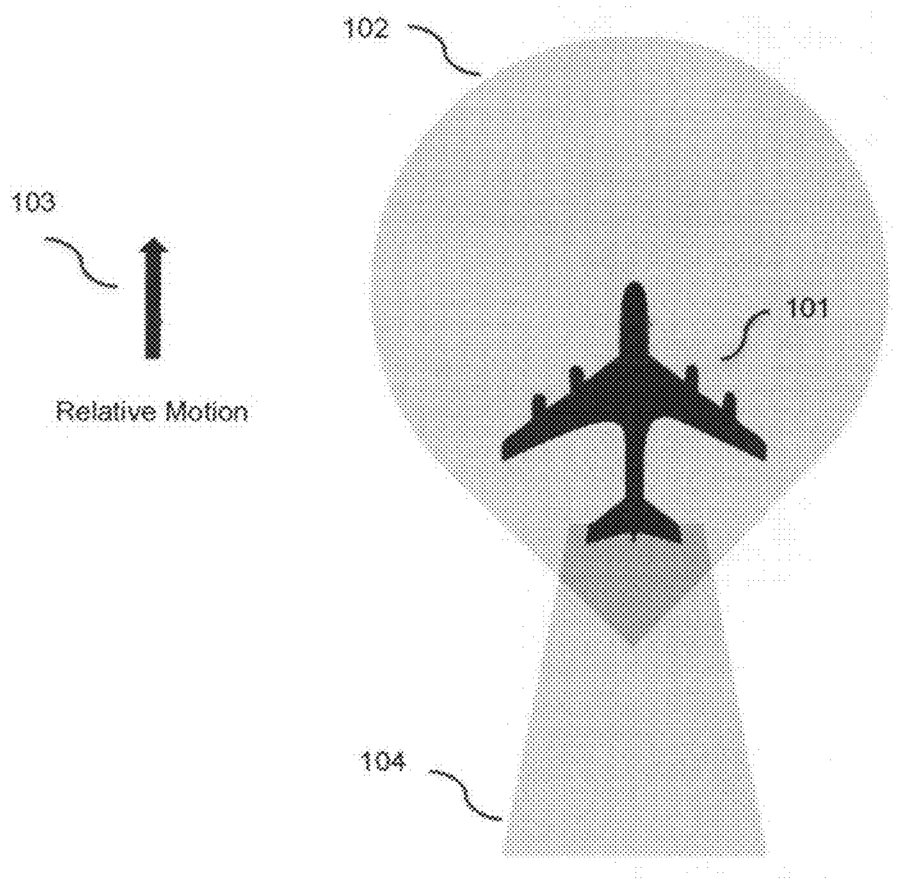

FIGURE 2 DI SWAB 2 (Profile View – example)
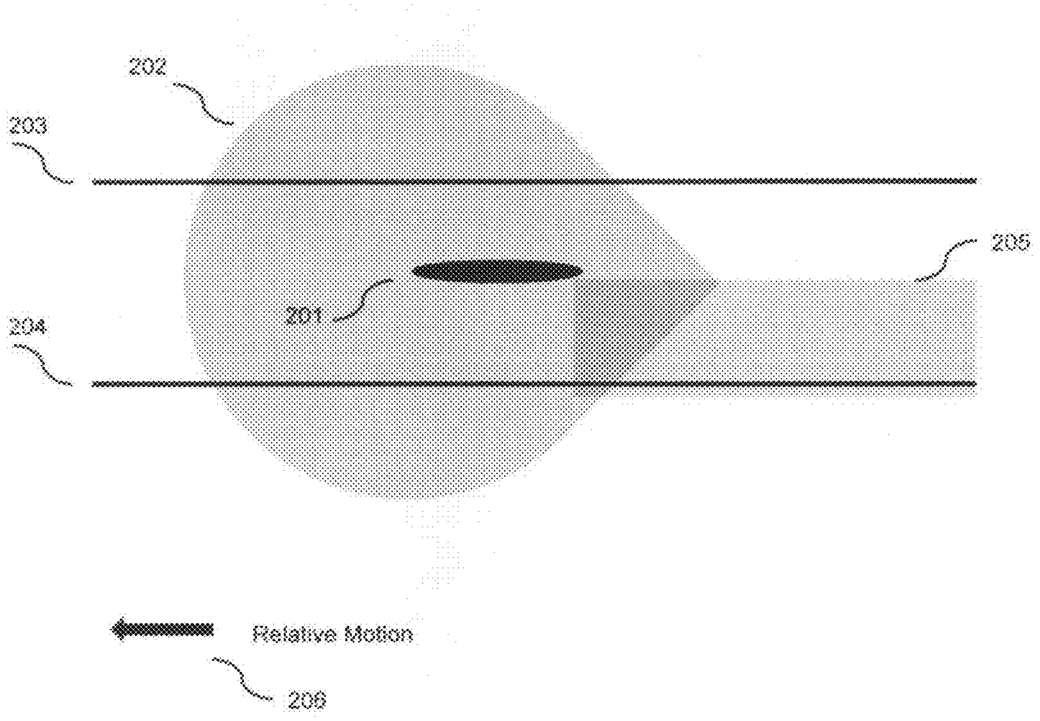

FIGURE 3 DI Typical Proximal Localizations (Plan View - example)
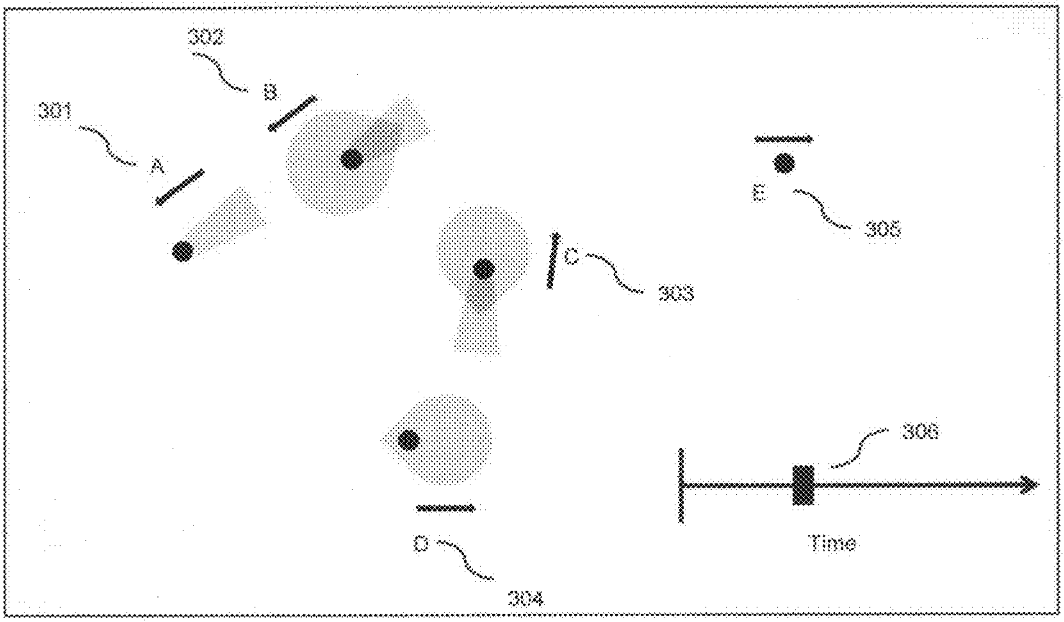
Air traffic control objects in motion where SWABs are proximal.

FIGURE 4 DI System-State Decision Matrix
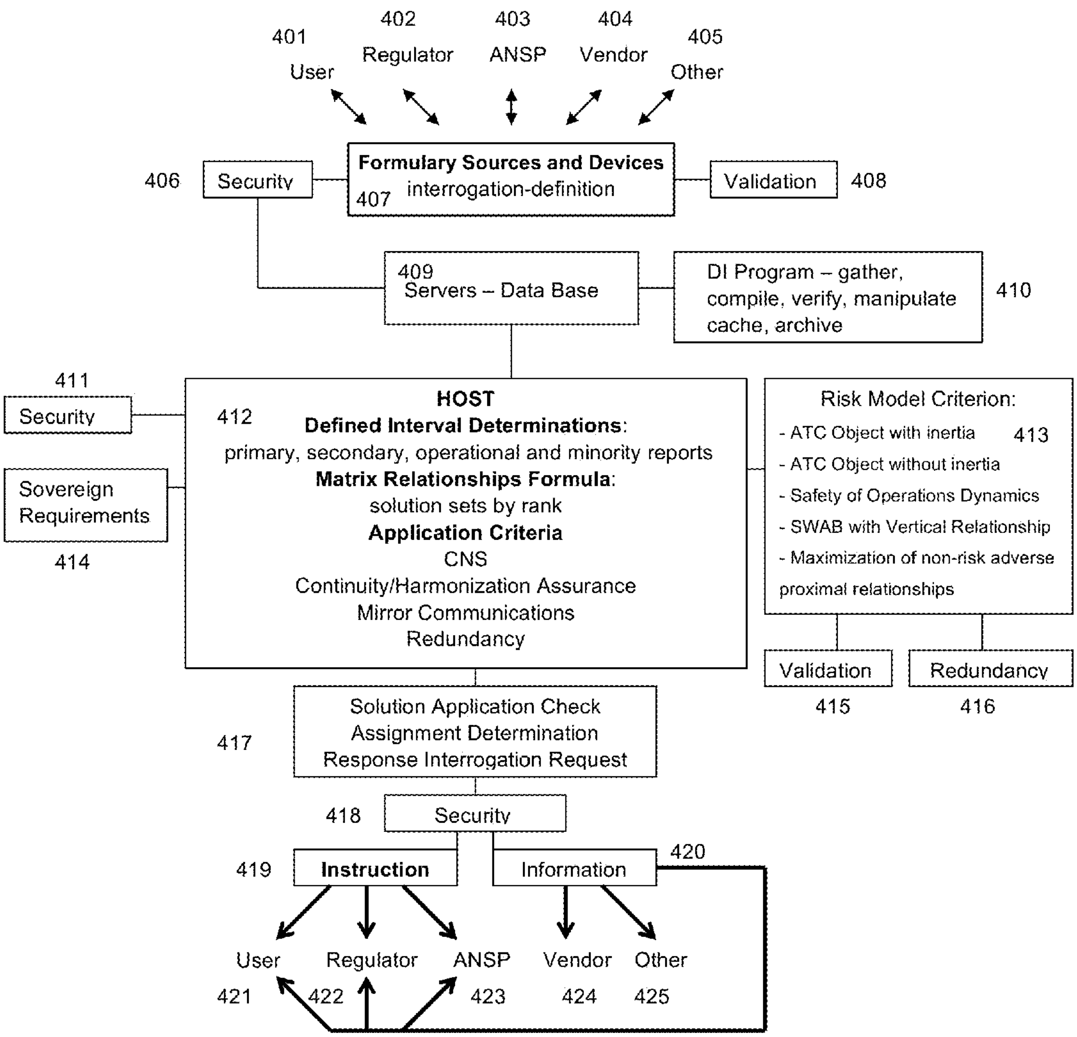

DEFINED INTERVAL (DI) RISK BASED AIR TRAFFIC CONTROL SEPARATION

CROSS-REFERENCE TO RELATED APPLICATIONS

This application claims the benefit of Applicant's prior provisional application, No. 61/650,332, filed on May 22, 2012.

FIELD OF THE INVENTION

The present invention relates to air traffic and flight operations control systems and methods, and more particularly to dynamic, continuously updated multilateral air traffic control separation assurance. The present invention provides a multi-dimensional safety-based analysis of operational relationships between associated air traffic control objects. Situational relationships that achieve or maintain allowable separation proximities, based on a valuation of risk specific to the dimensional association, are assigned and maintained.

BACKGROUND OF THE INVENTION

Air traffic control system-state engineering is fundamentally and necessarily based upon the application of rules and requirements to assure the safety of surface and inflight operations. Traditionally, this system-state engineering has been manifested in the form of separation criteria that capitalized on diverse regenerative technologies. The advent of non-linear modalities now introduces significant user centric functionality. But these individual discipline appended applications are not harmonized, and consequently introduce risk.

It is a requirement of air navigation service providers (ANSPs) to maintain an air traffic control infrastructure sufficient in scope and magnitude that prevents, to the extent possible, unsafe proximities of flight objects. ANSPs must also define and enforce standards necessary to maintain safety criterion based on known or projected risk. The process is dynamic, not static, and requires ANSPs to constructively factor evolutions of technology and user influence.

For nearly sixty years, radio detection and ranging (radar) has been relied upon as the formulary platform through which ANSPs have promulgated their authority. This functionality has provided a robust and efficient means to understand and ensure the spatial relationships of airspace users wherever radar coverage was available. This technology has been refined over time, and regulators have embraced these refinements incrementally. Though not yet obsolete, the introduction of global navigation satellite system (GNSS) functionality has rendered radar less efficient and no longer the exclusive or preferential method of attaining optimized situational air traffic control awareness.

In the systems and methods recognized in the prior art, ANSPs have relied on detection surveillance or more rudimentary manual calculations, or procedural control, to assimilate spatial understandings upon which to apply static separation criteria. Divided amongst common interest phases of flight, which include surface, terminal, enroute and oceanic subsets, these criteria have utilized a route structure model on which short-term valuations have been made for proximity assurance.

More recent evolutions in technology have allowed ANSPs to opt for functionality that predicts the influence of traffic management initiatives and that offers assignable "window" tasks to meter operations. Vendor users including but not limited to airlines, corporations, and inflight service providers, whose primary focus is the improved efficiency of their own tactical operations model have capitalized upon the advent of more intuitive technologies. This had led to parochial efficiency gains within the air traffic control environment. As a result of these and others, the air traffic control system-state can no longer tolerate static separation criteria or narrow span, sovereign design that lacks integrated, communicative relationships.

Many ANSPs now embrace a turn to GNSS reliance. The United States Federal Aviation Administration (FAA) has mandated the use of some satellite based Automatic Dependent Surveillance-Broadcast (ADS-B) technologies beginning in the year 2020. Operators subject to this rule will be required to identify themselves to ground-based stations used by the regulator to gather data necessary to derive ADS-B (out) position information. ADS-B (out) can be used to provide a wider and more precise geographical depiction than terrain based radar installations.

A natural evolution of ADS-B technologies may be the assimilation of data and information beneficial to both the users and the regulator. ADS-B (in) and ADS-C (contract) may provide this functionality through mutual and collaborative interrogation exchanges.

Both the FAA and the wider aviation community have precipitated and supported significant and comprehensive efforts to understand and realize the safety, operational and commercial advantage of technologies based on GNSS. Communication, navigation and surveillance (CNS) functionality now includes both airborne and ground based platforms that contribute to the optimization of aircraft and National Airspace System (NAS) operations.

The confluence of these technologies has yielded functionality that must be configured, harmonized and optimized. With Defined Interval, regulators will realize attainable, efficient, adaptive and responsive air traffic control separation standards through adaptive risk mitigation yielding enhanced safety and optimization within a harmonized system-state.

In contrast to the present invention, the prior art is not predicated on the applicability of risk associations to derive air traffic control solutions assignable to the user and is constrained only to embrace the prior art's static separation minima. Such prior art is user centric designed to affect only a single relationship with an individual user. It does not create, specify or advance a comprehensive regulator medium. Prior art describing a trajectory based operation uses projection, not understanding, to consider conflict then applies static prior art separation criteria, not risk based separation criteria.

SUMMARY OF THE INVENTION

The present invention creates an air traffic control system state, wherein separation between air traffic control objects is based on a real-time, continuously updated analysis of quantifiable risk. In contrast to the prior art systems, where static separations of fixed lateral and horizontal distances between objects are required, the present invention allows for dynamic separation that can adapt over time and by circumstance. This risk analysis is based upon information received from sources including the air traffic control objects themselves, weather sensors, airport information, radar, satellite, and flight crew qualifications, amongst others. Solution sets that include separation requirements for each air traffic control object are compared to an overall risk model, and acceptable separation requirements specific to the existing scenario in a given time interval are provided to each air traffic control object. The air traffic control objects then opt to perform an operation within the acceptable solutions sets, achieving an optimization of both safety and efficiency in the system-state.

The present invention provides a unique system and process for multilateral air traffic control separation assurance including the integration of air traffic control traffic management initiatives. This is achieved by conclusively defining relationship subsets mathematically and continuously. A matrix calculation associates one operation or air traffic control object with another, and determines whether the operation of one air traffic control object presents any risk to the other. The matrix makes continuous determinations for each pairing of objects within the system, and for all pairings of objects as a whole.

The present invention introduces the use of a Defined Interval system-state that achieves safety-based proximity determinations for air traffic control objects, predicated upon measurable dynamics including, but not limited to, the influence of time and changes in the phases of flight. For example, a Defined Interval solution between two proximal air traffic control objects may be enacted directing the achievement of an in-trail time elucidation, for a period of time, until that proximal relationship is no longer relevant, thence a solution set optimizing the understood intent, weighted for operational dynamics and formulary efficiency. The present invention allows for air traffic control objects to capitalize by and between non-risk adverse dimensional proximity relationships of varying structure where the solution refines efficiencies and throughput. The Defined Interval solution output from the matrix operations would derive solutions, such as changing a time requirement or performing an altitude change. The air traffic control object could choose between these options, providing a flexibility that is not available in the traditional systems defined by fixed separation requirements.

In the Defined Interval system state of the present invention, an air traffic controller maintains separation responsibility while assigning participants within the system, such as pilots, a spacing task that must be performed within defined boundaries. This enables a range of applications where dynamic interval spacing, closer than currently allowed using traditional separation standards, is possible.

The regulator or ANSP manages responsibility of the overall system, but the users and participants within the system are now provided with comprehensive, spacial, real-time information and can make both verbal and non-verbal requests for adjustments of their tasks. This functionality significantly increases efficiencies of the system as a whole.

The decision matrix evaluates adjustment requests and then determines the effect on the system assuming each adjustment request was granted; then approves or disapproves the request in the form of a requirement to the air traffic control object. For example, a request from an aircraft to change to a more efficient cruising altitude for a select period of time based on encountered wind conditions may be input into the decision matrix by the aircraft itself, or the aircraft operator after negotiating the change with the flight crew electronically. The decision matrix considers this request and its effect on proximal relationships and the system efficiency. A solution set would be generated by the decision matrix and transmitted to the air traffic control object requiring the change to be accomplished at a certain point or by a certain time. After acceptance and enactment, the change would be viewed systematically as an available altitude for another object that had previously made a request for change, or for an aircraft holding elsewhere in the air or on the ground.

This responsiveness of system accommodation is maximized without typical manual interactions. Existing systematic constraints associated with hard airspace boundaries respected in the prior art are mitigated in favor of the system-state in its entirety. In the prior art, flight crews and operators cannot maintain understandings of efficiency availabilities, or the intent of aircraft operating in their vicinity.

The present invention uses SWABs for each object within the system. A SWAB is a dynamic, continuously updated valuation of risk associated with the existence of an air traffic control object that defines the separation distances or time (criteria) surrounding the object in order to maintain safety and mitigate risk. In contrast to this feature of the present invention, previous methods of air traffic control accounted for risk and safety of an object by requiring fixed, static separation distances around the air traffic control object. Instead of fixed distances, the present invention uses SWAB values based on a valuation of risk made in real-time and taking into account current conditions in the area of the object, and other air traffic control objects within the system. The matrix factors the type of aircraft, weight, qualifications of crew, intent of aircraft and other factors not previously available, and will determine a SWAB for that object based and any risk that each and every air traffic control object poses to any other air traffic control object.

An air traffic control object is any vessel, vehicle, atmospheric condition, understood phenomenon, circumstance, or confine with mass or definition that either occupies or has an influence upon the statutorily regulated use of the earth's atmosphere. Air traffic control objects may be static (such as physical obstructions) or dynamic (such as moving aircraft and changing weather phenomena). Air traffic control objects are subject to oversight.

As discussed above, air traffic control objects are continuously assessed using the mathematical matrix algorithm to establish Defined Interval value criterion. The criterion is required to achieve and/or maintain non-risk adverse relationships. If the matrix determines that risk is associated with localization to an air traffic control object, it derives all solutions available. Congruent tasking is derived, sorted, ranked, and then assigned to any and/or each necessary relative association. Such associations are not limited to proximal relationships when non-risk adverse formulary influence is ranked causal. Non-risk factors, such as traffic management at an airport, are also taken into considerations when assigning a Defined Interval.

The invention utilizes Defined Interval value criterion to perpetuate a cognizant, interactive, and intuitive air traffic control system-state. Proactively sanctioned and assigned relationships with participating surface, terminal, enroute, or oceanic objects factor historical, real-time, and intent information. These assigned relationships factor understandings or variables provided by trusted sources. The Defined Interval value criterion create situation specific requirements to ensure up to a four dimensional relationship between air traffic control objects.

The invention provides a system-state that respects evolution to a multi-dimensional, multilateral safety based analysis of operational relationships wherein traditional legacy air traffic control separation standards found in the prior art are replaced, but can be replicated if circumstances dictate.

Defined Interval factors user dynamics by incorporating wind speed and direction data to include influenced vertical and lateral track and velocity. Defined Interval factors temperature, pressure and situational atmospheric conditions. Aircraft type, weight, configuration, crew qualifications and equipage are included in matrix computations. Existing and evolving understandings of wake turbulence prediction and mitigation are supported and factored. Sovereign requirements and exceptions can be accommodated. Gate, ramp and surface operations are also weighted within Defined Interval calculations. Surface operations can be assigned tasks and will utilize comparative, interactive "tower flight data management" technologies to maximize system-state.

A situational relationship is assignable based on a valuation of non-risk adverse ranked solution sets, specific to a dimensional association and/or traffic management initiatives.

Safety of operation dynamics is predicated on valuations of the introduction, tolerance and mitigation of risk. Collision potential and wake avoidance are benchmarks for the determination of acceptable risk associated with Defined Interval allowable proximities. Compliance with the allowable proximities may be further gauged by value to the system-state, rather than by a standard separation distance as used in the prior art. Solution sets of acceptable operations determined by the Defined Interval system of the present invention are assigned or applied to achieve maximized runway occupancy, optimized climbs, optimized descents and optimized cruise performance.

To determine a Defined Interval for an air traffic control object, the present invention implements a computer program stored on a server to automatically and collaboratively determine relationships in time and at intervals. A mathematical matrix that is part of the executed program is continuously cross-referenced and updated to apply understood relevancies to the determined relationships, understanding, and existing or projected risk. The determined relationships, understandings, and risks are then quantified. Computational valuations determined by the program are compared against acceptable risk conclusions. Solution sets of acceptable proximities are developed and ranked, with time being the preferred variable of each solution. In an interactive environment (human-in-the-loop), sets are weighed for task achievement and assigned. A "control-by-exception" environment (human-on-the-loop) would utilize ADS-C or contract functionality to optimize the system state.

Incremental adaptations of the "up to" four-dimensional criteria capitalize on technological advancements in CNS capabilities. In keeping with the goals and processes fundamental to FAA NextGen and European Union SESAR initiatives, using the Defined Interval system-state of the present invention as the as the premise platform redefines and reauthorizes relationships between the flight deck and air traffic control.

According to the present invention, the roles of both pilots and controllers are dynamic to the extent that after quantification, the task of achieving, assuring and maintaining a non-risk adverse operational relationship may be borne by both or either. It is envisioned that maintenance of a Defined Interval may incrementally become routinely tasked to a properly equipped flight deck.

Exceptions to a Defined Interval requirement may be incorporated for operations wherein flight crews are specifically authorized by a regulator to maintain an alternate interval for their air traffic control object on the final approach course in relation to a proximal air traffic object, for example another aircraft or the airport. The present invention supports the use of "visual-equivalent" technologies, such as Traffic Collision Avoidance Systems (TCAS), Cockpit Display of Traffic Information (CDTI), CDTI Enabled Delegated Separation (CEDS), Cockpit Assisted Visual Separation (CAVS) or Flight Interval Management Spacing (FIM-S) applications, any or all of which may expand the incidence of exceptions. Information acquired by these visual-equivalent technologies is also communicated to the computer database.

The Defined Interval system-state of the present invention enables the optimization of air traffic control system-state operations by factoring improvements in surface control, low visibility operations, closely spaced parallel operations (CSPO), and converging and intersecting runway operations. Next Generation initiatives supported by the present invention include In Trail Procedures (ITP), Airport Surface Detection Equipment Model X (ASDE-X), CSPO, Converging Runway Display Aid (CRDA), Relative Position Indicator (RPI), Automated Terminal Proximity Alert (ATPA), Traffic Analysis and Review Program (TARP), Simulation of the Air Traffic Control Radar Beacon System (SOAR), and Land and Hold Short Operations (LASHO). The present invention also supports and enhances enroute/arrival/departure-optimized procedures including Performance Based Navigation (PBN), Time Based Flow Management (TBM), Collaborative Air Traffic Management (CDM) and the Traffic Management Advisor (TMA). Additionally, environmental and energy sensitive considerations such as the Atlantic Interoperability Initiative to Reduce Emissions (AIRE) and the Asia and Pacific Initiative to Reduce Emissions (ASPIRE) are accounted for in the Defined Interval determinations of the present invention.

By bridging legacy separation standards, not replacing them, Defined Interval is fundamentally and uniquely adaptive. Defined Interval may be adapted to any existing or conceived state employed by an ANSP. Defined Interval is scalable and may be implemented incrementally. As such, the adaptations of a Defined Interval system-state offer resilience to variable economic and political influences.

In support of the conceptual process of "best equipped, best served" (BEBS), the Defined Interval system-state of the present invention provides the flexibility to support increased throughput. Aircraft and aircrews whose technological attributes meet higher levels of sophistication will be assigned Defined Interval separation proximities that maximize operations by enhancing terminal, enroute and oceanic operations. Conversely, those aircraft capable of operations using only legacy/traditional equipage will be identified and afforded a Defined Interval proximity solution that meets the safety assurances of current legacy separation standards, which are found in the prior art.

Considerations will continue to evolve over time and the integration of Unmanned Aerial Systems (UAS) and commercial space flight operations are accommodated. Restrictions on airspace use as a result of factors that these operations present fit the adaptive model of the present invention, and will be taken into account when determining relationships amongst air traffic control objects and acceptable Defined Interval solutions. Quantifying risk will mitigate fundamental Code of Federal Regulations (CFR)/Federal Aviation Regulation (FAR) "see and avoid" considerations that currently complicate unmanned operations.

Although the invention has been described and illustrated with reference to certain illustrative examples, it is not intended that the invention be limited to these illustrative embodiments. Those of skill in the art will recognize that various modifications and alternatives are possible without departing from the spirit of the invention. Accordingly, it is intended that the invention include all such modifications and alternatives as fall within the scope of the appended claims.

BRIEF DESCRIPTION OF THE FIGURES

FIG. 1—DI SWAB 1 (Plan View—example) illustrates typical air traffic control object that is in motion. SWAB example depicts areas where incursion would produce unacceptable risk.

FIG. 2—DI SWAB 2 (Profile View—example) illustrates typical air traffic control object that is in motion. SWAB example depicts areas where incursion would produce unacceptable risk.

FIG. 3—DI Typical Proximal Localizations (Plan View—example) illustrates typical air traffic control objects in motion. SWAB examples depict areas where incursion would produce unacceptable risk. Air traffic objects do not have DI components of forward longitudinal, bi-directional horizontal or aft longitudinal limits if no other air traffic object's associated component is not proximal.

FIG. 4—DI System-State Decision Matrix illustrates typical DI air traffic control system-state. HOST may interrogate through security. Respondents must reply to quierry.

DETAILED DESCRIPTION OF THE INVENTION

With the incorporation of dynamic automation architectures, pilots and controllers manipulate system variables to achieve specific outcomes. Available and integral components relied upon by the system manipulators include aircraft platforms and systems, radar surveillance functionality, GNSS technologies, and communication equipment to process, relay, display and store verbal and non-verbal information. These components are supported by continuous oversight and verification in the form of requirements, tests, certifications and redundancies. The present invention provides a means for successful utilization by requiring terrestrial elements in the form of defined airspace and airports with runways and support infrastructures.

The invention is a method and process to achieve a derivational operational Air traffic control end-state that may be enlisted by an ANSP where understandings supersede or replace prediction. Incorporating the assurances of current standards, and relative benefits of existing and projected technologies, the invention creates an efficient system-state predicated on optimized derivation. The invention creates realizations in time and understandings of an air traffic control object's intent while incorporating currently available functionality, and weighs these understandings against the risk model. The risk model is based on dynamic criteria, that may vary depending on the type of aircraft, technology, and the task assigned. The risk model is adaptive and factors understandings of regulator requirements and international agreements and criteria.

The method of the current invention gathers, compiles, verifies, manipulates and stores data from understandings through interrogation and by definition. Sources of information include aircraft and aircraft operators, the associated regulator and/or ANSP, weather sensors and databases, satellites, radar, airport operators, and applicable formulary sources or devices. This information is stored in a central database, which may be accessed through a server. This database may also be stored on a host computer, and the information stored in the database may be transmitted to any other computer or device within the air traffic control system through wired or wireless communication techniques. The process of the present invention is incorporated as steps that include a matrix computation, with the steps being part of a computer program stored in a non-transitory computer readable medium. The program may also be stored on a server, or in a host computer. The database is accessed through the server, and the information stored therein is communicated to a host computer running the software program that makes the Defined Interval determinations according to a matrix relationships formula. The results are transmitted to or accessible by air traffic controllers, aircraft crews, and a central monitoring station through wired or wireless communication techniques.

Defined Interval computations are made at no less than two centralized but geographically diverse, independent locations and compared. Each location includes a host computer, which accesses and executes the software program stored in the computer readable medium. The decision matrix selects a primary and secondary report weighted geographically when the computational resultant is identical. The decision matrix selects an operational and minority report when the computational resultant is not identical but contains any anomaly that does not introduce factors that affect an analysis of risk outside accepted parameters. This resultant operational report must provide advantage. The decision matrix rejects both the operational and minority report when the computational resultant contains factors that introduce risk outside accepted parameters. In the event of a rejected operational and minority report, the decision matrix shall request and evaluate data by refreshed interrogation until the findings contained in an operational or minority report exclude unacceptable risk. In the event of a refreshed interrogation request, and until a reconciled solution is attained within the matrix leading to a primary, secondary, operational or minority report, the last acceptable Defined Interval solution will apply and such shall be reported with advisement as conciliatory without effect. No conciliatory solution may subject an air traffic object to a non-acceptable risk. In the absence of required navigation performance, ascertained with confidence, the decision matrix will report solutions based on the achievement of a distance, altitude or time criterion previously deemed acceptable to the regulator.

Output of the matrix relationships formula provides solution sets in the form of air traffic control instructions. Typical solution sets would result in instruction for an aircrew to adjust the performance characteristics of their aircraft to meet specific objectives. These objectives might include a requirement to operate 2.5 nautical miles in trail of another aircraft at the same altitude. The decision matrix may provide controlled latitude that can be capitalized upon by the aircrew to comply with the requirement.

By having the ability to predicate safety and efficiency on operations known or assumed, the invention no longer relies upon the integration of non-compatible or non-formulary processes. The system-state "learns" by accepted confidences over time and by functionality, further enabling the risk model. Information management architectures are accommodated.

To achieve the system-state, air traffic control objects exist in the air traffic medium with announced autonomy; adjusted for risk that incorporates initiatives. The system-state will evolve by confidence from its current state, thereby preserving the legacy process and its integrity where necessary.

The host computer interfacing with the server executes the software program that includes the matrix relationships, risk models, and CNS information. The program then assigns an air traffic control object a mathematical SWAB with physical dimension that represents all risk associated with any operational proximity to it. The SWAB has component factors relative to position and intent and further assesses and incorporates an understanding of condition, equipage, crew qualifications and traffic management initiatives.

The SWAB does not define the air traffic control object; it defines associated, relative risk for each object that is dynamically adjusted in real-time according to the present circumstances surrounding the object, the intent of the object, and the intent of other air traffic control objects within the system.

According to the present invention, no SWAB may present risk to any air traffic control object. SWABs are geographically adjusted to reflect any attributable dynamic that quantitatively affects the risk associated with localization. Attributable dynamics are calculated and appended to the offender SWAB during localization. Individual SWAB component factors only apply a to proximal SWAB relationship if the component adds risk to the association.

As seen in FIG. 1, the SWAB of an air traffic object 101 in motion, wherein its dimensional definition is adjusted for relative inertia, consists of:

A forward longitudinal limit 102 projected in advance of relative inertia 103 by time; and tapering by radial component laterally and negatively from the achieved motion chord apex, whose restrictive dimensions may be waived by assumption, if concurrent with, and then to the extent that a Forward Longitudinal Limit projection of any other relative air traffic control object in motion exists. (This may be converted to distance by computational mathematical translation)

An aft longitudinal limit 104 projected by wake categorization rhombus in time inferior to relative motion, whose restrictive dimensions may be waived by assumption, if concurrent with, and then to the extent that a Forward Longitudinal Limit projection of any other relative air traffic control object in motion exists. (This may be converted to distance by computational mathematical translation)

A bi-directional horizontal limit projected perpendicular from the geographic core of an air traffic control object. Its geographical confines are the contained intersection of the radial component of it's Forward Longitudinal Limit projection, thence an inverse reflection of the positive radial component of the Forward Longitudinal Limit in time terminating at the point wherein the horizontal limit intersects the aft longitudinal limit. (This may be converted to distance by computational mathematical translation)

A relative vertical sector limit defined by incorporating the dimensional projection convergence of the forward longitudinal limit, aft longitudinal limit and horizontal limit calculated to achieve a Vertical relationship measured relative to an air traffic control object's inertia.

FIG. 2 illustrates the profile view of a SWAB for an air traffic control object in motion 201. The SWAB consists of a forward longitudinal limit 202, an upper limit of vertical relationship 203, a lower limit of vertical relationship 204, and an aft longitudinal limit 205. These limits and relationships take into account the relative motion 206 of the air traffic control object.

FIG. 3 illustrates typical proximal locations of air traffic control objects, A-E, in motion within a period of time 306 considered for a certain Defined Interval solution. As shown, an aft longitudinal limit of A 301 is proximal to forward longitudinal and bi-directional horizontal limits of B 302. The forward longitudinal, bi-directional horizontal and aft longitudinal limits of B 302 are proximal to forward longitudinal, bi-directional horizontal and aft longitudinal limits of C 303. Aft longitudinal limit of C 303 is proximal to forward longitudinal and bi-directional horizontal limits of D 304. Air traffic control object E 305 is illustrated as having no proximal SWABS.

The SWAB of an Air Traffic Control Object not in Motion, Wherein its Dimensional Definition is not Adjusted for Relative Inertia, Consists of:

An up to an omni-directional regular or irregular horizontal limit projected in time from the geographic core of an air traffic control object. Its geographical confines are the contained resultant of the radial component exclusive of non-formulary voids; whose restrictive dimensions may be waived by assumption, if concurrent with, and then to the extent that the SWAB of any other relative air traffic control object in motion exists. (This may be converted to distance by computational mathematical translation)

A relative vertical sector limit defined by incorporating the dimensional projection of the omni-directional horizontal limit calculated to achieve a Vertical Relationship measured in time relative to the air traffic object, whose restrictive dimensions may be waived by assumption, if concurrent with, and then to the extent that the SWAB of any other relative air traffic control object in motion exists. (This may be converted to distance by computational mathematical translation)

Vertical Relationship (VR)

A mitigated vertical proximity limit measured in time whose resultant confine incorporates the geographic relationship above and below a SWAB adjusted for relative inertia if applicable. (This may be converted to distance by computational mathematical translation)

Risk Model Criterion

Risk model criterion is requirements certain, demonstrated to achieve "substances of process findings" that measure flight safety dynamics associated with the existence and or operation of air traffic control objects.

Substance of Process Findings

Substance of process findings is the resultant analysis of any proximal localization of air traffic control objects factoring intent wherein the conclusion defines a standard necessary to achieve acceptable risk.

Substance of process findings factor the physical and operational characteristics of air traffic control objects in adverse relationships for the purpose of determining when any air traffic control object poses, or no longer poses a functional or operational risk to another, measured over time. (This may be converted to distance by computational mathematical translation).

Substance of process findings is formulated up to twice per second or as necessary on every relative association. Any number of congruent findings may yield an equivalent resultant solution set.

Safety of Operation Dynamics

Safety of operation dynamics is predicated on valuations of the introduction, tolerance and or mitigation of risk. Relationship determinations in time and at intervals are quantified. Continuously cross-referenced, matrix derived relationships apply relevant existing and projected risk. Computational valuations would be compared and solution sets developed then ranked.

Maximization of Non-Risk Adverse Proximal Relationships

Air traffic control objects subject to oversight, whether voluntarily or involuntarily, static or in purposeful motion, are continuously mathematically assessed.

Congruent tasking is derived, sorted, ranked then assigned to any, and then each necessary relative association. Such associations are not limited to proximal relationships when non-risk adverse formulary influence is ranked causal.

Sorted solution tasking is assigned preponderantly to intent allowing four-dimensional associations without risk along announced autonomous navigation. Intent may be task supplemented or task superseded by application when formulary stimuli not available or exchanged are ranked priority in favor of systematic safety and or efficiency.

Sovereign Specific Applications

The invention formalizes a method and process that optimizes the air traffic control system-state. Required criteria whose definition is proprietary or the subject of security dynamics will be incorporated with indemnity. Sovereign specific features can be adapted and are transitional to the extent DIs will sort solution sets to guarantee boundary integrity.

FIG. 4 illustrates the system of the present invention, including the Defined Interval System State Decision Matrix. Users 401, Regulators 402, ANSPs 403, Vendors 404, and Other system participants 405 are in bidirectional communication with Formulary Sources and Devices 407. Users 401, Regulators 402, ANSPs 403, Vendors 404, and Other system participants 405 transmit information and queries. The devices 407 include interrogation and definition capabilities. The information within the devices 407 is monitored by a device for validation 408, and the information is then transferred through secure transmission means 407 to a Database hosted on a Server 409. A Defined Interval application program 410, stored on a computer readable medium and executable by a computer processor, gathers, verifies, manipulates, caches and archives this data. This Defined Interval program 410 is in bidirectional communication with the server and database 409. The server and database 409 are in bi-directional communication with a host computer 412 through secured transmission means 411. The host computer executes a program stored on a computer readable medium in order to make Defined Interval determinations. This program may also be stored at a server, and accessed on the server by the host computer. The host computer makes defined interval determinations including primary, secondary, operations, and minority reports. The host computer executes a matrix relationships formula that produces solutions sets, sorted by rank. Application criteria taken into consideration in the determinations made by the host computer include CNS, continuity/harmonization assurance, mirror communications, and redundancy. The solutions sets are weighted against a risk model 413, which is checked for validation 415 and redundancy 416. Following this, a solution application check, assignment determination, and response interrogation request 417 is transmitted from the Host computer 412 in the form of instructions 419 and information 420. These transmissions may be made on a secure communication channel 418. The instructions 419 and information 420 are transmitted to Users 421, Regulators 422, ANSPs 423, Vendors 424, and Other participants 425 in the system state.

The invention claimed is:

1. A method of achieving a risk-based optimized air traffic control system state, comprising:

a plurality of sensors in communication with at least one central monitoring station including a host computer with a database acquiring and assimilating data relative to the air traffic control system-state, said data including interactive, real-time information from air traffic control objects, data from environmental sensors and measurement devices, and data regarding regulation standards;

at least one processer executing a program to associate a SWAB confine around each air traffic control object, said SWAB confine based on known or determined risk associated with the operation of an air traffic control object relative any other air traffic control object;

optimizing the air traffic control system state by associating, in time and over time, SWAB confine associations and how each SWAB confine association may or may not present risk to any other air traffic control object;

creating directed solutions for operating the air traffic control object, wherein the solutions may include risk-based achievements for the air traffic control object to make or separation distances or times to maintain;

wherein said solutions are based on acceptable determinations after applied risk model criterion analysis;

said solutions predicated upon a matrix relationship formula and application criteria calculation; and assigning solutions by interrogation and response to a flight management computer or other displays congruent to the air traffic control objects within the system for enactment, wherein the solution meets safety and efficiency thresholds that may include sovereign requirements.

2. The method of claim 1 wherein risk confines are produced, assessed and reported where said object's risk is defined, and then displayed by a valuation referred to as a SWAB in reference to its shape, and appending the SWAB to the air traffic control object for comparison with at least other SWABs that consist of ordered determinations, where said determinations are calculated substance of process findings.

3. The method of claim 1 wherein risk-based, air traffic control object requirements are created factoring safety of operations dynamics to maximize non-risk adverse proximal relationships, said requirements can include proximity assurance tasks or operational requirements that assure and maintain non-risk adverse associations transmitted and displayed to the air traffic control objects for implementation.

4. An air traffic operations control system, said system comprising:

at least one central monitoring station including a host computer modified to run specific programs in support of defined interval solutions;

a plurality of air traffic control objects, wherein each air traffic control object includes a transmitter and receiver for bi-directional communications;

a plurality of data gathering sensors in communication with the host computer and the plurality of air traffic control objects, said sensors including environmental sensors and measurement devices;

a database in communication with the host computer, air traffic control objects, and data gathering sensors, said database acquiring and assimilating data relative to the air traffic control system-state, said data including interactive, real-time information from said air traffic control objects, data from the plurality of sensors, and data regarding regulation standards; and at least one processor executing a program stored on a non-transitory computer readable medium, said processor;

associating, in time and over time, defined interval solution associations and how each defined interval solution may or may not present risk to any other air traffic control object;

creating directed solutions for operating the air traffic control object, wherein the solutions may include risk-based achievements for the air traffic control object to make or separation distances or times to maintain;

wherein said solutions are based on acceptable determinations after applied risk model criterion analysis;

said solutions predicated upon a matrix relationship formula and application criteria calculation; and assigning solutions by interrogation and response to a flight management computer or other displays congruent to the air traffic control objects within the system for enactment wherein the solution meets safety and efficiency thresholds that may include sovereign requirements.

5. The system of claim 4 wherein defined interval solutions are produced, assessed and reported where said object's risk is defined, and then displayed by a valuation referred to as a SWAB in reference to its shape, appending the SWAB to the air traffic control object for comparison with at least other SWABs that consist of ordered determinations, where said determinations are calculated substance of process findings.

6. The system of claim 4 wherein risk-based, air traffic control object requirements are created factoring safety of operations dynamics to maximize non-risk adverse proximal relationships, said requirements can include proximity assurance tasks or operational requirements that assure and maintain non-risk adverse associations transmitted and displayed to the air traffic control objects for implementation.

* * * * *